United States Patent [19]
Ledford

[11] 4,298,435
[45] Nov. 3, 1981

[54] LIQUID SMOKE AND ITS PRODUCTION

[75] Inventor: Charles D. Ledford, Crossville, Tenn.

[73] Assignee: The Baltimore Spice Company, Baltimore, Md.

[21] Appl. No.: 147,989

[22] Filed: May 8, 1980

[51] Int. Cl.³ .............................................. A23B 4/04
[52] U.S. Cl. ....................................... 201/8; 426/314; 426/650
[58] Field of Search ................... 426/314, 650; 201/8, 201/27, 30

[56] References Cited

U.S. PATENT DOCUMENTS

| | | | |
|---|---|---|---|
| 3,492,134 | 1/1970 | Brümmendorf | 426/650 |
| 3,615,729 | 10/1971 | Baker | 426/314 |
| 3,873,741 | 3/1975 | Melcer et al. | 426/314 |
| 3,875,314 | 4/1975 | Wistreich et al. | 426/650 |
| 3,969,996 | 7/1976 | Huang et al. | 426/314 |
| 4,136,206 | 1/1979 | Kulesza et al. | 426/650 |

FOREIGN PATENT DOCUMENTS 2424266 11/1975 Fed. Rep. of Germany ...... 426/314

OTHER PUBLICATIONS

J. Agr. Food Chem., vol. 14, No. 6, Nov.-Dec. 1966.
J. Agr. Food Chem., vol. 17, No. 6, Nov.-Dec. 1969.

*Primary Examiner*—Hiram Bernstein
*Attorney, Agent, or Firm*—Lawrence I. Field

[57] ABSTRACT

A liquid smoke with superior toning (meat coloring) properties is produced from hardwoods by an automated process in which the raw materials, temperatures and other process variables are carefully controlled within narrow limits to yield a uniformly high quality product.

9 Claims, No Drawings

LIQUID SMOKE AND ITS PRODUCTION

This invention relates to an improved liquid smoke and to the process whereby it is produced.

Liquid smoke is a natural smoke flavoring prepared by the absorption of real smoke from hardwoods in an aqueous solution.

Various procedures for the preparation of liquid smoke useful for the smoking of food products are described in a number of issued United States Patents, including U.S. Pat. No. 3,873,741, issued Mar. 25, 1975 and in the art cited as references in said patent or discussed as prior art in the specification of said patent.

In attempting to produce a reproducible high quality smoke by the procedures described in the prior art, applicant found that the results were erratic and that the quality of the liquid smoke product varied considerably when batch processes were utilized. It was also found that when large amounts or air were utilized in the carbonization of wood, a serious fire and explosion hazard existed.

The present improvements on the rotary calciner process disclosed in Seaman, U.S. Pat. No. 1,236,885, issued Aug. 14, 1917 and in Melcer et al, U.S. Pat. No. 3,873,741, issued Mar. 25, 1975, will be apparent from the description which follows, which sets forth a preferred embodiment of this invention, as required by the Patent Statutes.

The new and improved liquid smoke product of the present invention is produced from carefully selected raw material, namely finely divided hardwood, preferably hickory. This could be produced from hickory trees by grinding or sawing the same, but I prefer to utilize the product which is available at sawmills which, after appropriate treatment, is suitable for the practice of my process.

The sawdust available from commercial sawmills consists of pieces of bark, chips or other wood fragments, slivers and other extraneous material in addition to the finely divided wood termed sawdust. The first step in my process comprises separating the sawdust from the coarse and undesired material. I accomplish this by means of an oscillating screen with quarter-inch holes but other means could be employed to separate the pieces of bark, slivers and other coarse material from the sawdust.

The sawdust recovered after the screening process is conveyed to a hopper from which it is fed into a drier by means of a variable pitch, variable speed auger whereby the rate of discharge may be varied as desired by the operator. The sawdust is conveyed to the drier where it is heated by direct or by indirect contact with hot gases and is dried to a moisture content of below about 5%, e.g. 2-3%. Because the chunks and slivers and other coarse pieces of wood have been screened out of the material entering the drier, the temperature at which the drier is operated is lower than would be required to dry sawdust containing such pieces. In order to obtain the dried sawdust product, it is only necessary to heat the sawdust to about 210° F., thereby avoiding temperatures at which the sawdust is subject to scorching and possible burning which adversely affects the quality of the ultimate liquid smoke product. In the present process, drying may be affected at any suitable temperature below about 225° F.

From the drier, the sawdust is discharged into a hopper from which it is fed into one end of a rotary calciner which comprises a stainless steel tube having lifters on the internal surface of the tube and disposed inside a shell which serves as a support for the calciner tube and which contains several banks of burners which heat the exterior of the tube. The burners are individually controlled so that the temperature of the calciner itself may be kept at any desired value so that the several chemical reactions which occur when wood is pyrolyzed may be caused to occur in a desired sequence and to a desired extent.

The sawdust consists of two principal components identified generally as cellulose and lignins, and while not wishing to be bound by any specific theoretical explanation of what occurs in the calciner, it is believed that when the sawdust enters the entry end of the calciner which is maintained at 900° F., the first reaction which occurs is the carbonization of the cellulose, along with the evolution of acetic acid and various other products from the sawdust, as the lignins begin to carbonize. It has been found that the temperatures of the calciner must be maintained within very narrow ranges which are critical, in order that the reactions occur in the proper sequence so that the eventual smoke product has the desired properties and therefore sensors are placed in the calciner to sense the temperature and to cause the burners in the shell, which heat the calciner tube, to open or close to provide more or less heat in order to maintain the required temperature at the entry zone of the calciner.

Since the reactions which occur as the wood is carbonized are exothermic in part, the sensing means in the calciner will reduce the fuel feed to the burners so that their output plus the heat generated in the calciner will suffice for the temperature to be 900° F.

The smoke produced and the reactions which occur in the calciner are affected by the amount of air present, e.g., as described in U.S. Pat. No. 3,873,741, and the article by Pettet and Lane referred to therein. In the present process, the calciner tube is connected to the wood supply through a tightly sealed joint so that no air can enter the calciner except that entrained by the wood as it is fed into the rotating tube. Furthermore, the tube is maintained under a slight positive pressure to minimize infiltration of air into the calciner, by leakage through any openings which may exist.

Temperatures along the length of the calciner are monitored by additional sensors so that at the entry end the temperature is maintained at about 900° F., in the middle section (lengthwise) the temperatures are held at about 900° F., and at the exit of discharge end, the temperature is between about 800° and 825° F.

The calciner is inclined at an angle of about 5°, the upper end being the end at which the wood enters and the lower end being the end at which the charred product and smoke exit. Means to rotate the calciner at any desired speed are provided. A calciner has been successfully operated with a rate of rotation of about 3 rpm for a tube 24 inches in diameter (I.D.) and 7/16 inches thick and 20.75 feet long equipped with eight 3-inch lifters to advance the wood material along the length of the calciner.

The charcoal which is the solid product produced in the calciner is discharged without quenching since it is at a sufficiently cool temperature that it does not catch fire and burn.

The smoke product leaves the calciner at between 325° F. and 375° F. and passes into a packed tower through which an aqueous liquid containing condensed smoke is recycled at a temperature of about 150° F.±10° F. When the recycled liquid reaches a desired smoke concentration, some of it is withdrawn and additional water is introduced into the recycling liquid.

The products which leave the calciner pass into a fractionating tower from which two products are recovered when the smoke is condensed in water. By suitably monitoring the temperature in the tower, the "smoke" produced in the calciner can be separated into two or more products which can be separately recovered. In the present process, two products are recovered, namely, (1) crude pyroligneous acid which contains the desired liquid smoke product, and (2) a tar-free pyroligneous acid which is recovered at the top of the fractionating tower.

The products recovered are stored in tanks which permit any tar present to separate by settling. The liquid smoke product produced by the above described process exhibits the following properties, depending on the extent to which it has been diluted with water to produce a liquid smoke with the properties required by a particular meat processor.

The charcoal discharged from the calciner contains not in excess of 25%, preferably below 20% volatiles and is discharged into a closed chamber where it cools to below the temperature at which any ignition can occur.

In general the products exhibited a superior ability to tone meat and other food products and to impart a desired smoky flavor thereto.

They possess the following properties:
Freezing point: 26° F.
Boiling point: 208°–213° F.
Density: 88.8 lbs/gal.
Color: Amber and depending on the concentration of the liquid smoke product which is recovered:

|  | A | B | C | D |
|---|---|---|---|---|
| Acidity to pH 7 | 5.5%–6.5% | 7.5%–8.5% | 9.5%–10.5% | 10.5%–11.5% |
| *Toning index | >6 | >9 | >11 | >13 |

*colorimetric test

I claim:

1. In a process for producing liquid smoke from hardwoods wherein the wood is pyrolyzed and the smoke product is absorbed in an aqueous solution, the improvements which comprise:

separating all pieces coarser than ½ inch from a sawmill sawdust and recovering the wood fines from said separating step;

drying the wood fines to a moisture content below about 5% moisture by heating the same to a temperature no higher than 225° F.

calcining the dried wood below a temperature of 925° F. in the absence of any added air;

fractionating the wood smoke produced by said calcination by absorbing some of the smoke in an aqueous liquid and collecting the same and separately recovering the remainder of the smoke which is not absorbed in said liquid.

2. The liquid smoke product produced by the process of claim 1.

3. The process of claim 1 in which all pieces coarser than ¼ inch are separated from the material to be calcined.

4. The process of claim 1 in which the wood fines are dried to about 2–3% moisture.

5. The process of claim 4 in which the drying is accomplished at temperatures below about 210° F. so that charring is avoided.

6. The process of claim 1 in which the wood is calcined in a rotary calciner in which the pressure is maintained slightly above atmospheric pressure to eliminate entry of air into the calciner.

7. The process of claim 1 in which the calcination is conducted by heating the wood fines to temperatures between 900° and 925° F.

8. The process of claim 1 including in addition, the step of separating tar from the liquid smoke produced.

9. The process of claim 1 in which the smoke product recovered is an aqueous smoke solution with the following properties:
Freezing point: 26° F.
Boiling point: 208°–213° F.
Density: 88.8 lbs/gal
Color: Amber and depending on the concentration of the liquid smoke product which is recovered:

|  | A | B | C | D |
|---|---|---|---|---|
| Acidity to pH 7 | 5.5%–6.5% | 7.5%–8.5% | 9.5%–10.5% | 10.5%–11.5% |
| *Toning index | >6 | >9 | >11 | >13 |

*colorimetric test.

* * * * *